J. S. RAWLINGS, Jr.
HARROW ATTACHMENT FOR PLOWS.
APPLICATION FILED APR. 9, 1915.

1,148,254.

Patented July 27, 1915.
2 SHEETS—SHEET 2.

Inventor
Joshua S. Rawlings Jr.
By
Mann & Co.
Attorneys.

UNITED STATES PATENT OFFICE.

JOSHUA S. RAWLINGS, JR., OF BALTIMORE, MARYLAND.

HARROW ATTACHMENT FOR PLOWS.

1,148,254. Specification of Letters Patent. Patented July 27, 1915.

Application filed April 9, 1915. Serial No. 20,118.

*To all whom it may concern:*

Be it known that I, JOSHUA S. RAWLINGS, Jr., a citizen of the United States, residing at Baltimore, in the State of Maryland, have invented certain new and useful Improvements in Harrow Attachments for Plows, of which the following is a specification.

This invention relates to a soil pulverizer or harrow particularly adapted for attachment to sulky or other plows whereby the soil may be plowed and harrowed at one operation.

The object of the invention is to provide an improved drag form of harrow attachment for plows that may be readily adjusted to attain the desired drag on the soil with respect to the plow.

The invention consists in the novel construction, combination and arrangement of devices, hereinafter described and particularly pointed out in the appended claims.

The accompanying drawings illustrate the invention wherein,—

Figure 1:
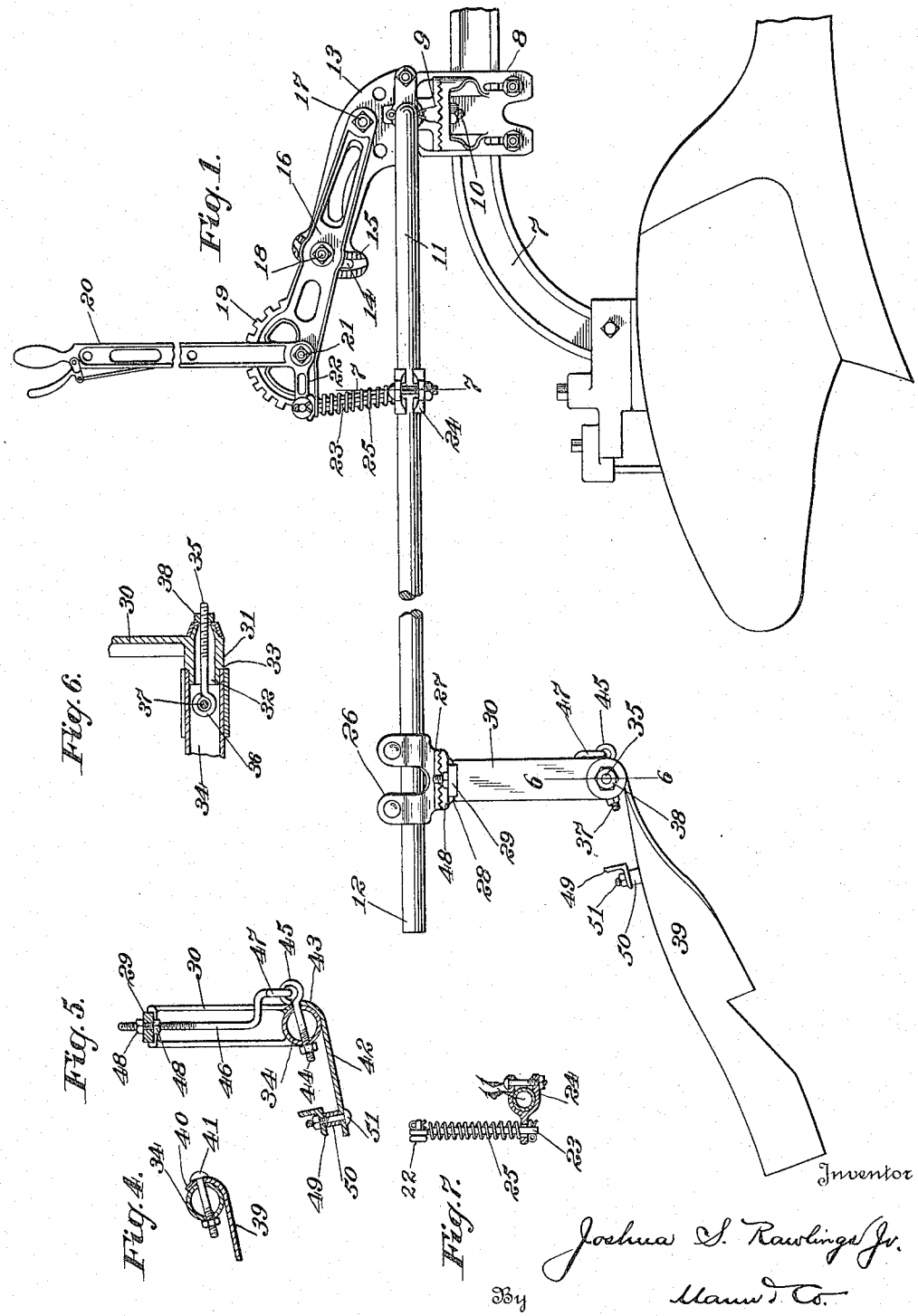
Figure 2:
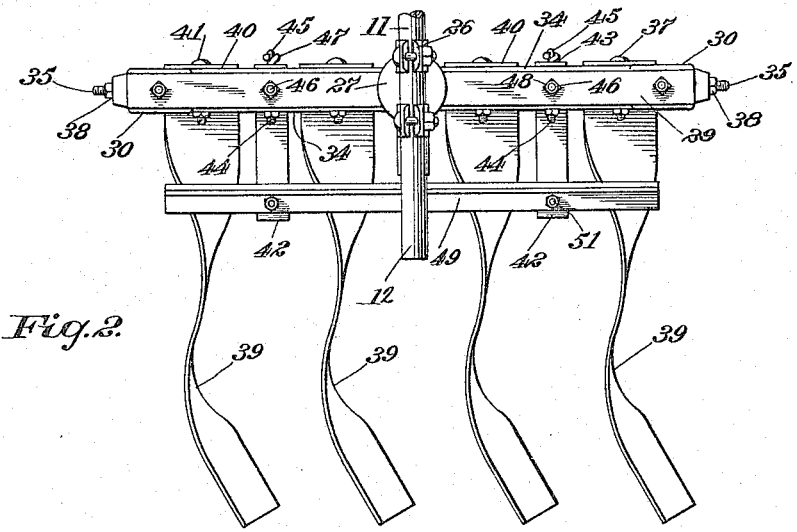
Figure 3:
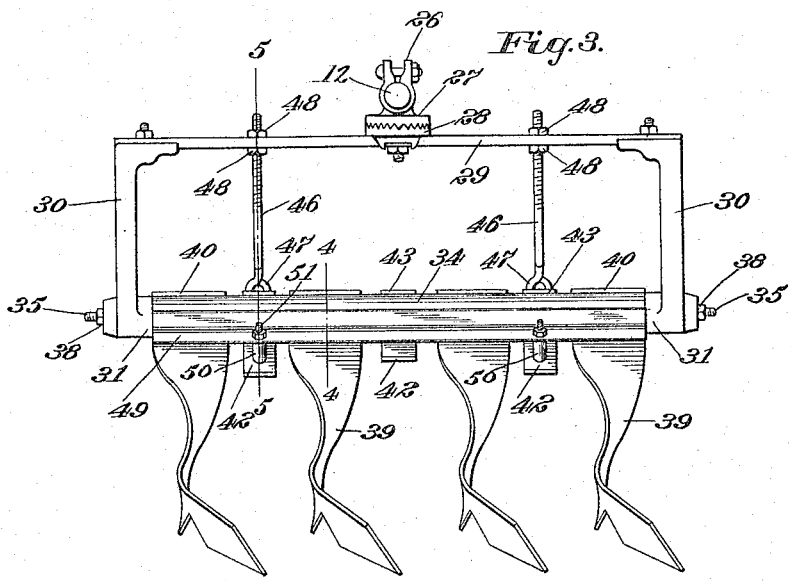

Figure 1, shows in side elevation, a portion of a plow to which the improved soil pulverizer or harrow is attached. Fig. 2, illustrates the pulverizer or harrow attachment in top plan. Fig. 3, shows the same in rear elevation. Fig. 4, illustrates a cross-sectional detail through one of the harrow teeth and the tubular bar that carries the same,—the section being taken on the line 4—4 of Fig. 3. Fig. 5, shows a cross-sectional detail through the harrow,—the section being taken on the line 5—5 of Fig. 3. Fig. 6, illustrates a cross-sectional detail through one of the end-bars of the harrow frame and the end of the tubular harrow tooth or colter bar,—the section being taken on the line 6—6 of Fig. 1, and Fig. 7, shows a cross-sectional detail through the clamp plate on the harrow-carrying bar and the rod that supports the same.

Referring to the drawings by numerals 7, designates the plow beam to which a bracket 8, is adjustably secured so that a bearing plate 9, may seat thereon and be held thereto by means of a vertical bolt 10. This bearing plate pivotally sustains one end of a harrow-carrying bar 11, so that the other free end 12, of said bar may be raised or lowered in any well-known manner. In the present instance an arm 13, extends laterally from the bearing plate 9, and has a segment slot 14, therein with a serrated surface 15, at each side of the slot. An adjustable arm 16, is pivotally connected at 17, to the arm 13, and is pivoted with an adjusting bolt 18, that extends through the segment slot 14, whereby to adjustably secure the arm 16, with respect to said bearing arm. A segment bar 19, is provided at the free end of arm 16, and an operating lever 20, has its lower end pivoted at 21, to said arm 16, so that a pawl device carried on the lever may engage the segment bar and hold the operating lever in any one of a number of positions. The lower end of operating lever 20, has a short arm 22, to which is pivotally connected the upper end of a depending bolt or rod 23. The lower end of this rod passes freely through a hole in a clamp plate 24, on the harrow-carrying bar 11, and a coiled spring 25, encircles the rod and is compressed between the arm 22, and the clamp plate 24, so as to yieldingly press the clamp plate and bar 11, downwardly.

The mechanism and devices thus far described are in many respects similar to devices heretofore employed and in so far as the present invention is concerned any means may be employed that will pivotally and yieldingly sustain the harrow-carrying bar 11, and which will provide for vertically ad-
justing the free end of said bar.

A bracket clamp 26, is secured on the carrying bar 11, and is provided with a serrated disk 27, so that a coacting disk 28, carried on the harrow frame may be adjustably secured thereto.

The harrow frame is suspended from a horizontal bar 29, and has two upright end bars 30, which depend from opposite ends of the horizontal bar 29. The lower end of each end bar has an inwardly-projecting tubular sleeve 31, with a reduced inner end 32, so as to form an annular shoulder 33. A tubular bar 34, extends cross-wise between the in-turned tubular sleeves and receives the reduced ends of the latter, as shown in Fig. 6, of the drawings,—the ends of the tubular bar seating against the annular shoulders 33, which prevent the bar from moving longitudinally on the sleeves. A bolt 35, extends inwardly from the outer end of each tubular sleeve and is provided with an eye 36, at its inner end so that a cross bolt 37, may extend crosswise of the tubular bar 34, and pass through said bolt-eye 36, so as to secure the inner end thereof. A nut

38, on the outer end of the bolt 35, serves to draw the sleeve and tubular bar together. It will thus be seen that the tubular bar 34, is sustained in substantially a horizontal position between the lower ends of the end bars 30, of the frame; that by means of the bolt 35, said end bars are locked against outward springing and that by loosening the nuts 38, said tubular bar may be turned or rotated more or less on the inner ends of the tubular sleeves, which adjustment is advantageous as will presently appear.

A series of harrow teeth or colters 39, are carried by and extend rearwardly from the tubular bar 34,—the forward ends 40, of said teeth being curved upwardly around the front side of the tubular bar and secured by bolts 41, that pass through said curved-up ends and also through the tubular bar, as clearly shown in Fig. 4 of the drawings. The particular curvature and shape of the teeth 39, is not essential, but it is important that teeth be employed because I particularly desire to employ teeth that will drag on the soil. Obviously the teeth may be formed to turn either to the right or to the left. At intervals along the tubular bar I prefer to arrange short clod crushing plates 42,—the forward ends 43, of which curve up around the front side of the bar and are secured thereto by means of bolts 44. The bolts 44, are provided with eyes 45, at their outer ends and to these eyes are connected adjusting bolts 46, which depend from the horizontal upper bar 29,—eyes 47, being provided at the lower ends of the adjusting bolts to engage the eyes 45, and adjusting nuts 48, on the upper ends of the adjusting bolts.

It will thus be understood that by loosening nuts 48, or bolts 46, and the nuts 38, on bolts 35, the tubular bar 34, may be rocked on the sleeves 31, and the teeth 39, raised or lowered as desired, so that the inclination of the teeth with respect to the carrying bar 11, may be readily varied and tightening of the nuts will then hold the parts in adjusted position.

An angle stop bar 49, extends horizontally over the series of harrow teeth and is held in a somewhat elevated position by means of spacer blocks or sleeves 50, that seat on the short crusher plates 42. Bolts 51, extend through the plates 42, then through the sleeves and finally through the angle stop bar to secure the latter in place. If therefore a tooth is sprung upwardly by contact with an unyielding object the stop bar will be engaged and the entire frame will yield upwardly carrying the bar 11, with it,—the spiral spring 25, taking the shock.

From the foregoing explanation it will be seen that my improved harrow attachment is adjustable at at least four points,— 1st, at the bearing 9; 2nd, at the pivot end of bar 11; 3rd, at the adjustment between the bar 11, and harrow frame and 4th, between the tubular bar 34, and sleeves 31, so that the desired drag of the harrow teeth on the soil with respect to the plow may be readily obtained.

Having thus described my invention what I claim is,—

1. The combination with a plow beam, of a bar pivoted with respect to the beam; means for yieldingly sustaining the bar; a harrow frame carried by the bar; a bar extending crosswise of the harrow frame; harrow teeth having their forward ends connected to said frame bar and trailing at the rear of the latter and means for adjusting and varying the general direction of the trailing teeth with respect to the pivoted yielding bar.

2. The combination with a plow beam, of a bar pivoted with respect to the beam; means for yieldingly sustaining the bar; a harrow frame carried by the bar; a bar extending crosswise of the harrow frame; harrow teeth having their forward ends connected to said frame bar and trailing at the rear of the latter and means for rocking the bar to which the forward ends of the trailing teeth are connected and thereby varying the inclination of the trailing teeth with respect to the pivoted yielding bar.

3. The combination with a plow beam, of a bar pivoted with respect to the beam; means for yieldingly sustaining the bar; a harrow frame carried by the bar; a tubular bar carried by the harrow frame; means for rotatably mounting the tubular bar on the harrow frame; teeth having their forward ends rigidly connected to the tubular bar and trailing at the rear of the latter and connections between the tubular bar and the harrow frame for rocking said bar to vary the inclination of the trailing teeth with respect to the pivoted bar.

4. The combination with a bracket for attachment to a plow beam, of a bar having one end pivoted to said bracket; a harrow frame adjustably connected to the free end of said bar said frame having two depending end bars; a tubular bar mounted to rock between the end bars of the harrow frame; harrow teeth having their forward ends rigidly connected to said tubular bar and trailing at the rear of the latter and adjusting bolts connecting the tubular bar with the frame to lock the tubular bar against rocking and hold the trailing teeth at an adjusted inclination with respect to the first-named pivoted bar.

5. The combination with a bracket for attachment to a plow beam, of a bar having one end pivoted to said bracket; a harrow frame adjustably connected to the free end of said bar said frame having two depending end bars with inturned tubular sleeves; a tubular bar having its ends engaged with the tubular sleeves of the end bars of said harrow frame; harrow teeth having their forward ends rigidly connected to the tubular bar and trailing at the rear of the latter and means for adjustably turning the tubular bar on the tubular sleeves to vary the inclination of the trailing teeth with respect to the first-named pivoted bar.

In testimony whereof I affix my signature in presence of two witnesses.

JOSHUA S. RAWLINGS, Jr.

Witnesses:
PORTER H. FLAUTT,
BERTHA K. WALTER.

Copies of this patent may be obtained for five cents each, by addressing the " Commissioner of Patents, Washington, D. C."